(12) United States Patent
Takada

(10) Patent No.: US 9,662,961 B2
(45) Date of Patent: May 30, 2017

(54) HEATING APPARATUS

(71) Applicant: SANDEN CORPORATION, Isesaki-shi (JP)

(72) Inventor: Kazumasa Takada, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 279 days.

(21) Appl. No.: 14/395,414

(22) PCT Filed: Apr. 8, 2013

(86) PCT No.: PCT/JP2013/060624
§ 371 (c)(1),
(2) Date: Oct. 17, 2014

(87) PCT Pub. No.: WO2013/157430
PCT Pub. Date: Oct. 24, 2013

(65) Prior Publication Data
US 2015/0125139 A1 May 7, 2015

(30) Foreign Application Priority Data

Apr. 20, 2012 (JP) .................................. 2012-096766
May 14, 2012 (JP) .................................. 2012-110563
Jul. 19, 2012 (JP) .................................. 2012-160496

(51) Int. Cl.
F24H 1/10 (2006.01)
F24H 1/12 (2006.01)
(Continued)

(52) U.S. Cl.
CPC ........... *B60H 1/2221* (2013.01); *F24H 1/009* (2013.01); *F24H 1/101* (2013.01); *F24H 1/121* (2013.01);
(Continued)

(58) Field of Classification Search
None
See application file for complete search history.

(56) References Cited

U.S. PATENT DOCUMENTS 1,671,677 A * 5/1928 Keeton ................... F24H 1/142
392/489
1,978,690 A * 10/1934 Peterson ................. F24H 1/102
392/461
(Continued)

FOREIGN PATENT DOCUMENTS

JP 11-325343 11/1999
JP 2000-320893 11/2000
(Continued)

*Primary Examiner* — Thor Campbell
(74) *Attorney, Agent, or Firm* — Cozen O'Connor

(57) ABSTRACT

A heating apparatus which is assembled by inserting a columnar heating wire heater 2 into a hole 30 provided in a case 3, and heats cooling water introduced into the case 3 by the heating wire heater 2, wherein the heating wire heater 2 is inserted into boss portions 42 and 43 provided in the case 3, both end portions are supported by O-rings 50 disposed between inner peripheral walls of the boss portions 42 and 43 and an outer peripheral wall of the heating wire heater 2, a gap 45 for passing the cooling water is formed along an outer peripheral surface of the heating wire heater 2 between the two boss portions 42 and 43 within the case 3, and a tapered portion 60 and a rounded portion 61 are formed on an end portion on an insertion-direction distal end side of the heating wire heater 2.

4 Claims, 3 Drawing Sheets

(51) Int. Cl.
*B60H 1/22* (2006.01)
*H05B 3/40* (2006.01)
*H05B 3/78* (2006.01)
*F24H 1/00* (2006.01)

(52) U.S. Cl.
CPC ............... *H05B 3/40* (2013.01); *H05B 3/78* (2013.01); *B60H 2001/2268* (2013.01); *B60H 2001/2278* (2013.01)

(56) References Cited

U.S. PATENT DOCUMENTS

| | | | | |
|---|---|---|---|---|
| 2,580,659 A * | 1/1952 | Corbett | ............. | F24H 1/202 392/486 |
| 2,775,683 A * | 12/1956 | Kleist | ............. | F25B 43/00 222/146.3 |
| 3,584,194 A * | 6/1971 | Kautz | ............. | B05B 9/002 165/156 |
| 3,835,294 A * | 9/1974 | Krohn | ............. | H05B 3/00 219/517 |
| 4,465,922 A * | 8/1984 | Kolibas | ............. | F24H 1/121 165/156 |
| 4,480,172 A * | 10/1984 | Ciciliot | ............. | F22B 1/288 165/140 |
| 4,723,065 A * | 2/1988 | Meyer | ............. | F02M 31/125 123/549 |
| 5,325,822 A * | 7/1994 | Fernandez | ............. | F24H 9/2028 122/448.3 |
| 5,408,578 A * | 4/1995 | Bolivar | ............. | F24H 1/102 219/481 |
| 5,740,315 A * | 4/1998 | Onishi | ............. | F24H 1/121 392/483 |
| 5,872,890 A * | 2/1999 | LaCombe | ............. | F24H 1/102 392/487 |
| 5,892,887 A * | 4/1999 | Thomas | ............. | F24H 9/2028 138/143 |
| 6,205,292 B1 * | 3/2001 | Pokorny | ............. | F24H 1/142 392/465 |
| 6,240,250 B1 * | 5/2001 | Blanco, Jr. | ............. | F24H 1/102 392/474 |
| 6,477,323 B2 * | 11/2002 | Koizumi | ............. | F24H 9/1818 219/536 |
| 7,088,915 B1 * | 8/2006 | Sturm | ............. | F24H 9/2028 392/465 |
| 7,190,894 B2 * | 3/2007 | Chamberlain, Jr. | .... | F24D 17/00 392/465 |
| 7,286,752 B2 * | 10/2007 | Gourand | ............. | A47J 31/542 392/465 |
| 7,565,065 B2 * | 7/2009 | Kato | ............. | F24H 1/142 392/311 |
| 8,180,207 B2 * | 5/2012 | Shirai | ............. | E03D 9/08 392/465 |
| 8,249,437 B2 * | 8/2012 | Commette | ............. | F24H 1/102 29/432 |
| 8,577,211 B2 * | 11/2013 | Lucker | ............. | F24H 1/142 392/470 |
| 2006/0151458 A1 * | 7/2006 | Shirai | ............. | E03D 9/08 219/217 |

FOREIGN PATENT DOCUMENTS

| | | |
|---|---|---|
| JP | 2004-125035 | 4/2004 |
| JP | 2006-38242 | 2/2006 |
| JP | 2006-132857 | 5/2006 |
| JP | 2007-10255 | 1/2007 |
| JP | 2011-143780 | 7/2011 |

* cited by examiner

A – A SECTION

HEATING APPARATUS

RELATED APPLICATIONS

This is a U.S. National stage of International application No. PCT/JP2013/060624 filed on Apr. 8, 2013.

This patent application claims the priority of Japanese application nos. 2012-096766 filed Apr. 20, 2012, 2012-110563 filed May 14, 2012 and 2012-160496 filed Jul. 19, 2012, the disclosure content of all of which are hereby incorporated by reference.

TECHNICAL FIELD

The present invention relates to a heating apparatus which heats a heating medium by a heating element.

BACKGROUND ART

A technique is known in which a heating apparatus that heats a heating medium such as cooling water by a heating wire heater (a heating element) is mounted on a vehicle, such as a hybrid automobile and an electric automobile, in which it is difficult to sufficiently use waste heat of an engine, and is used for heating the vehicle or the like.

For example, in Patent Document 1, a columnar heating wire heater is buried in a heat transfer body formed of heat transfer metal, the heat transfer body is installed within a case in which a heating medium circulates to constitute a heating apparatus, and the heating medium is heated by bringing the heating medium into contact with a surface of the heat transfer body.

PRIOR ART DOCUMENT

Patent Document

Patent Document 1: Japanese Patent Laid-Open No. 2011-143780

SUMMARY OF THE INVENTION

Problems to be Solved by the Invention

However, when the structure in which the heating medium is heated via the heat transfer body is employed as in Patent Document 1 described above, there is a problem that the heating apparatus has a larger size and weight due to the existence of the heat transfer body, and heat exchange efficiency is lowered by an increase in heat capacity.

Thus, a heating apparatus having a configuration in which a surface of a heating wire heater is made of a material, such as stainless steel, having anti-rust properties, and a heating medium is directly brought into contact with the surface of the heating wire heater has been studied. For example, the heating apparatus is considered to have a configuration in which the heating apparatus is assembled by providing O-rings on both ends of a columnar heating wire heater, and inserting the heating wire heater into a hole provided in a case, and leakage of the heating medium circulating around the heating wire heater to the outside is prevented by the O-rings.

However, since the O-rings are formed of rubber, the O-rings may be damaged when the heating wire heater is inserted into the case during assembly of the heating apparatus. Also, the O-rings may be deteriorated due to heat generated by the heating wire heater.

The present invention has been made based on the aforementioned circumstances, and an object thereof is to provide a heating apparatus having good assembling properties and high heat exchange efficiency by preventing damage or deterioration of an O-ring by a simple configuration.

Means for Solving the Problems

In order to achieve the above object, a heating apparatus of the present invention is a heating apparatus which is assembled by inserting a columnar heating element into a hole provided in a case, and heats a heating medium introduced into the case by the heating element, wherein at least one end portion of the heating element is inserted into a boss portion provided in the case, and is supported by an O-ring disposed between an inner peripheral wall of the boss portion and an outer peripheral wall of the heating element, a heating medium passage for passing the heating medium is formed along an outer peripheral surface of the heating element on an inner side of the O-ring within the case, and a tapered portion is formed at least on an end portion on a distal end side in an insertion direction into the boss portion of the heating element.

Preferably, a rounded portion is provided on the outer peripheral surface of the heating element between the tapered portion and a support position of the O-ring.

Also, a heating apparatus of the present invention is a heating apparatus which is assembled by inserting a columnar heating element into a hole provided in a case, and heats a heating medium introduced into the case by the heating element, wherein the heating element includes a cylindrical tube portion formed of a material having heat transfer properties, and a heating wire provided inside the tube portion, at least one end portion of the heating element is inserted into a boss portion provided in the case, and is supported by an O-ring disposed between an inner peripheral wall of the boss portion and an outer peripheral wall of the heating element, a heating medium passage for passing the heating medium is formed along an outer peripheral surface of the heating element on an inner side of the O-ring within the case, and the heating wire is arranged apart, to an axially inner side, from respective contact positions of the two O-rings when the heating element is inserted into the case.

Also, a heating apparatus of the present invention is a heating apparatus which is assembled by inserting a columnar heating element into a hole provided in a case, and heats a heating medium introduced into the case by the heating element, wherein the heating element includes a cylindrical tube portion where a tapered portion is formed at least on one end portion, a heating wire provided inside the tube portion, and a bottom plate that seals an end portion on the tapered portion side of the tube portion, the end portion is inserted into a boss portion provided in the case, and is supported by an O-ring disposed between an inner peripheral wall of the boss portion and an outer peripheral wall of the heating element, a heating medium passage for passing the heating medium is formed along an outer peripheral surface of the heating element on an inner side of the O-ring within the case, and the bottom plate is arranged on an axially inner side of the tube portion with respect to the tapered portion.

Preferably, the bottom plate is welded to an inner wall of the tube portion to seal the end portion of the tube portion.

Preferably, the heating apparatus is mounted on a vehicle, wherein the heating medium is cooling water used for an air-conditioning system of the vehicle.

Advantageous Effects of the Invention

According to the present invention, the heating medium passage is formed facing the outer peripheral wall of the columnar heating element within the case, and the heating medium passes through the heating medium passage to thereby come into contact with the outer peripheral wall of the heating element. Thus, the heating medium can be efficiently heated, and the heating apparatus having good heat exchange efficiency can be obtained.

The heating apparatus is also assembled by inserting the columnar heating element into the case, the heating medium passing through the heating medium passage can be prevented from flowing outside by the O-ring, and good assembling properties can be obtained by the simple configuration.

Moreover, since the tapered portion is formed on the insertion-direction distal end side of the heating element, damage of the O-ring with the end portion of the heating element being caught when the heating element is inserted during assembly of the heating apparatus can be prevented.

According to the present invention, since the rounded portion is provided on the outer peripheral surface of the heating element between the tapered portion and the support position of the O-ring, the heating element can be smoothly inserted during assembly of the heating apparatus, so that the assembling properties can be improved.

According to the present invention, since the heating wire provided inside the heating element is arranged apart, to the axially inner side, from the respective contact positions of the two O-rings when the heating element is inserted into the case, heat transfer to the O-rings can be suppressed when heat is generated by the heating wire. Therefore, deterioration of the O-rings due to the heat generated by the heating wire can be suppressed, and leakage of the heating medium from the inside of the case can be prevented for a long period.

According to the present invention, since the bottom plate of the heating element is arranged on the axially inner side with respect to the tapered portion, the tapered portion can be additionally processed so as to adjust the shape of the tapered portion or the entire length of the tube portion. Also, the end portion on the bottom plate side of the heating element can be made hollow, and a temperature rise in the end portion can be suppressed when the heat is generated by the heating wire, so that the heat resistance of the boss portion of the case supporting the end portion can be reduced.

According to the present invention, since the bottom plate is welded to the inner wall of the tube portion to seal the end portion of the tube portion, weld scale on the outer side of the tube portion can be reduced, and a connection position on the outer side of the tube portion can be eliminated. Airtightness at the boss portion when the heating element is inserted into the case can be improved.

According to the present invention, the cooling water used for the vehicle air-conditioning system can be heated by the heating apparatus. Accordingly, it is possible to provide the heating apparatus suitable for hybrid vehicles and electric vehicles, and having good assembling properties and high heat exchange efficiency with the simple configuration.

MODE FOR CARRYING OUT THE INVENTION

Figure 1:
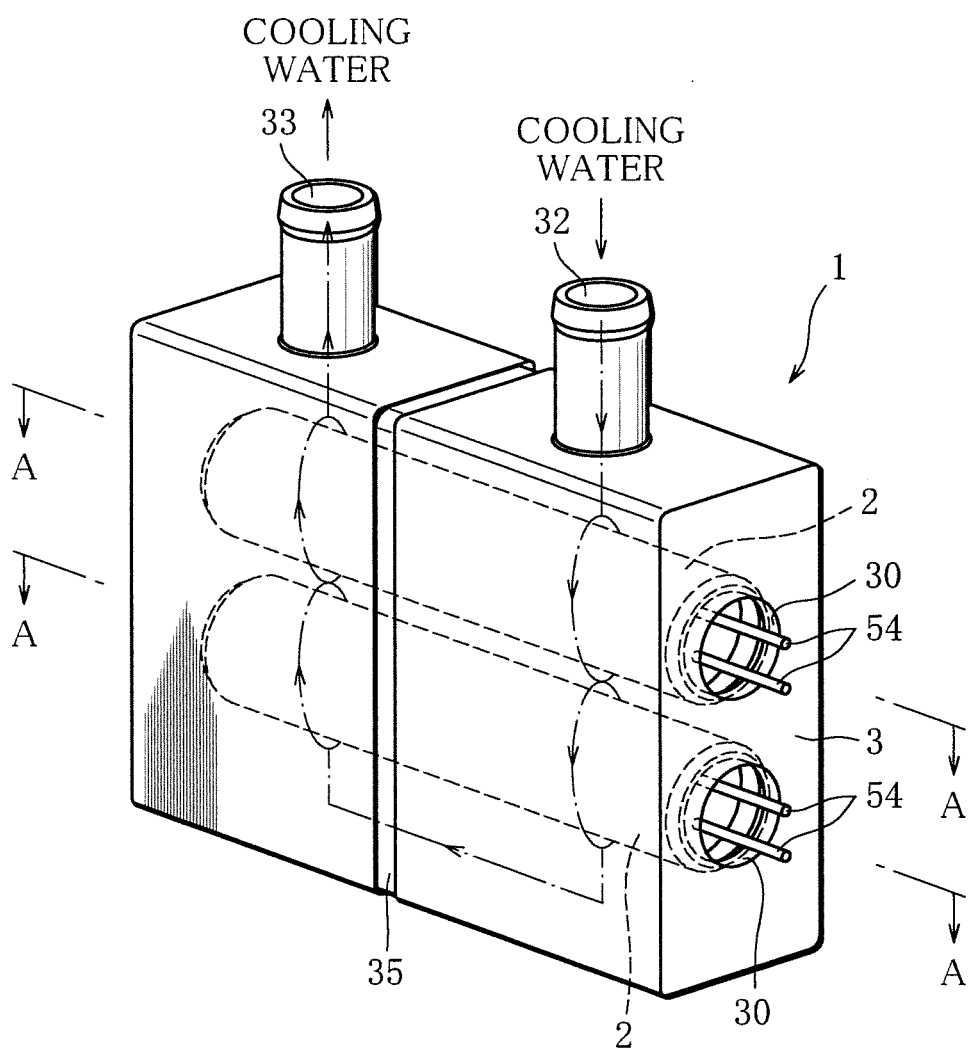
FIG. 1 is a perspective view illustrating the appearance of a heating apparatus of one embodiment of the present invention.
Figure 2:
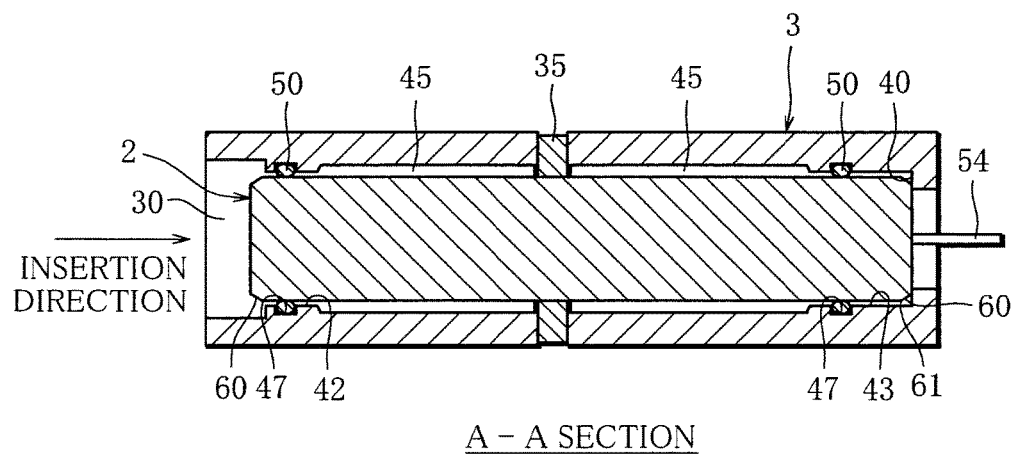
FIG. 2 is a lateral sectional view of the heating apparatus in an insertion portion of a heating wire heater in FIG. 1.
Figure 3:
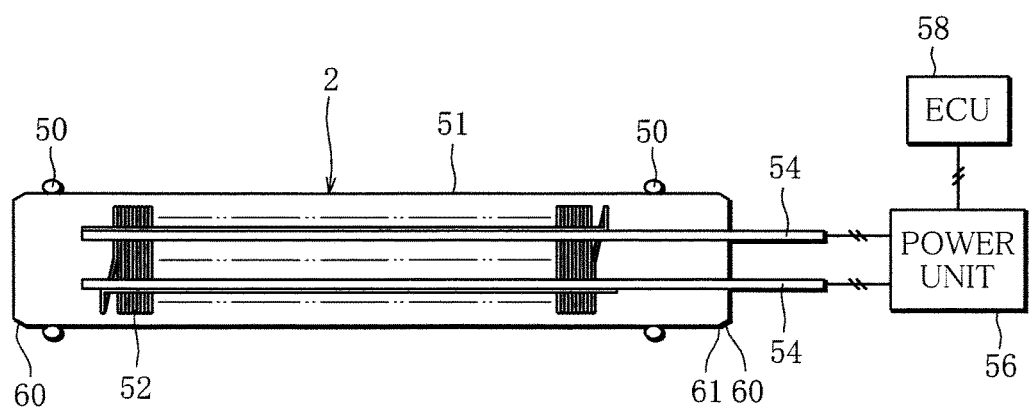
FIG. 3 is a lateral sectional view illustrating the internal structure of the heating wire heater in FIG. 1.

A heating apparatus of one embodiment of the present invention is described by using FIGS. 1 to 3.

FIG. 1 is a perspective view illustrating the appearance of a heating apparatus of one embodiment of the present invention.

As shown in FIG. 1, a heating apparatus 1 includes two columnar heating wire heaters 2 (heating elements), and a case 3 that accommodates the heating wire heaters 2.

The heating apparatus 1 is mounted on a vehicle such as a hybrid automobile and an electric automobile, and is used for heating a heating medium such as a refrigerant circulating in a refrigerating circuit of a vehicle air-conditioning system, as an auxiliary heat source that supplies heat so as to compensate for insufficient waste heat of an engine (a heat source) in the case of the hybrid automobile, and as an alternative heat source that supplies heat instead of an engine not existing in the case of the electric automobile.

To be more specific, in the case of the hybrid automobile, the heating apparatus 1 is interposed in a cooling water circuit of the engine, and can introduce LLC (cooling water, antifreeze solution) circulating in the cooling water circuit as the heating medium and heat the LLC by the heating wire heaters 2. The cooling water circuit is provided in the vehicle air-conditioning system. The heat of the LLC heated in the engine and the heating apparatus 1 is used for heating the refrigerant circulating in the refrigerating circuit provided in the above air-conditioning system, so that a vehicle interior can be cooled and heated.

On the other hand, in the case of the electric automobile, the heating apparatus 1 is interposed in the refrigerating circuit in which the refrigerant circulates, and can introduce the refrigerant as the heating medium and heat the refrigerant by the heating wire heaters 2. The refrigerating circuit is provided in the vehicle air-conditioning system similarly to the above hybrid automobile, and a vehicle interior can be cooled and heated by the heat of the refrigerant heated in the heating apparatus 1. A configuration may be also employed in which water is introduced as the heating medium, the water is heated by the heating wire heaters 2 to be warm water, and the warm water is used as a heat source for heating a refrigerant or the like circulating in a heating circuit of the vehicle air-conditioning system as an alternative heat source of the engine.

Moreover, in either case of the hybrid automobile and the electric automobile, the heating apparatus 1 may be provided together with an unillustrated heater core in a heating circuit in which an unfreeze solution circulates, and the heating apparatus 1 may be used as one of heat sources for the unfreeze solution so as to blow air heated by the heater core.

As shown in FIG. 1, the case 3 is formed in a rectangular-parallelepiped box shape having a space therein, and two holes 30 for inserting the heating wire heaters 2 are provided in one side surface at a vertical interval. An inlet portion 32 and an outlet portion 33 for cooling water are also provided on an upper surface of the case 3.

A partition portion 35 that vertically extends in an intermediate portion in a right and left direction in FIG. 1 and separates the space within the case 3 into right and left sides is provided within the case 3. Holes into which the heating wire heaters 2 can be inserted are formed in the partition portion 35. The partition portion 35 is also formed such that the right and left spaces in the case 3 can communicate with each other below the two heating wire heaters 2.

FIG. 2 is a lateral sectional view of the heating apparatus 1 in an insertion portion of the heating wire heater 2.

As shown in FIG. 2, the right and left width of the case 3 is set to be slightly larger than the length of the heating wire heater 2.

The hole 30 for inserting the heating wire heater 2 provided in the case 3 penetrates the case 3 in the right and left direction. A step 40 is provided on one edge portion of the hole 30 so as to make the diameter of the hole smaller than the outer diameter of the heating wire heater 2. The heating wire heater 2 can be inserted into the hole 30 from a side not having the step 40, and is positioned by being inserted into the case 3 until its distal end comes into contact with the step 40.

Boss portions 42 and 43 into which a front end portion and a rear end portion of the heating wire heater 2 are inserted are formed in the case 3. Annular grooves 47 are provided in inner peripheral walls of the boss portions 42 and 43, and O-rings 50 are respectively inserted into the grooves 47.

When the heating wire heater 2 is fully inserted into the case 3 until contacting the step 40, the front end portion and the rear end portion of the heating wire heater 2 are supported by the O-rings 50 held in the boss portions 42 and 43.

A gap 45 (a heating medium passage) is provided between the two O-rings 50 held in the boss portions 42 and 43 within the case 3 so as to enable flow of cooling water along an outer peripheral wall of the heating wire heater 2. The gap 45 forms a portion of the space in the case, and communicates with the space in the case 3 above and below the heating wire heater 2. The gap 45 is formed with a small width such that the heating medium passing through the gap 45 passes through a position as close as possible to the outer peripheral wall of the heating wire heater 2. Also, the gap 45 is divided into right and left sides by the partition portion 35.

As shown in FIG. 3, the heating wire heater 2 is formed by inserting a coiled heating wire 52 such as a nichrome wire into a bottomed-cylindrical metal pipe 51 (a tube portion), filling the metal pipe 51 with a heat-resistant insulation material having high electrical insulation and thermal conductivity in a pressurized manner, and enclosing the heating wire 52. Examples of the heat-resistant insulation material include magnesium oxide, and a body of the heating wire heater 2 including the heat-resistant insulation material and the metal pipe 51 has a heat-resistant temperature of about 1100° C. Also, the metal pipe 51 is formed of metal, such as stainless steel, having anti-rust properties.

Terminals 54 that are connected to the heating wire 52 and project outside at distal ends are provided at one end of the metal pipe 51. The respective terminals 54 of each of the heating wire heaters 2 are electrically connected to an external power unit 56.

The power unit 56 is electrically connected to an external electronic control unit (ECU) 58 that comprehensively controls a vehicle. The ECU 58 enables electrification control to individually pass electricity to each or both of the terminals 54 of each of the two heating wire heaters 2 via the power unit 56.

In the present embodiment, tapered portions 60 of about several mm are formed particularly on both end portions of the metal pipe 51, that is, the both end portions of the heating wire heater 2.

Moreover, a rounded portion 61 is provided on an outer peripheral surface of the heating wire heater 2 between the tapered portion 60 on an insertion-direction distal end side and a support position of the O-ring 50.

Figure 4:
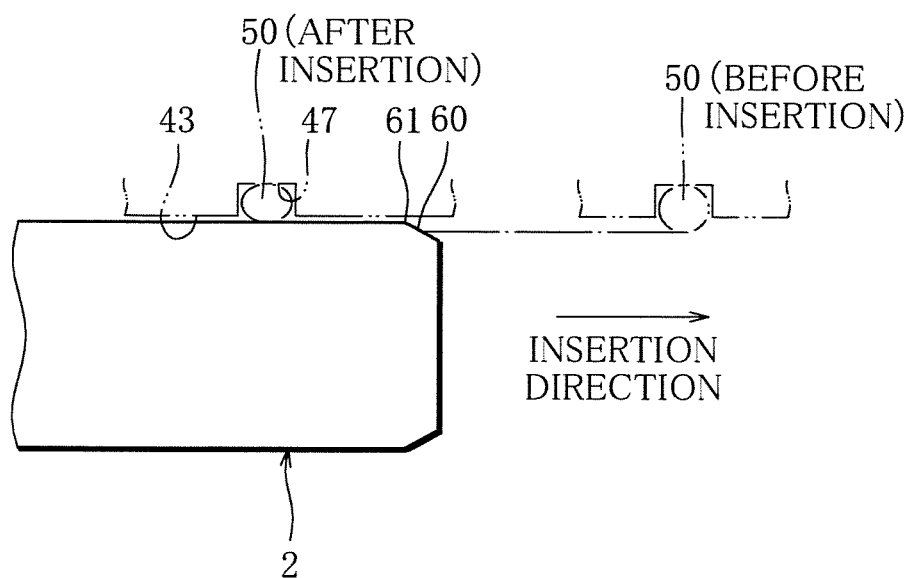
FIG. 4 is an enlarged view illustrating the shape of an end portion of the heating wire heater in FIG. 1.

More specifically, as shown in FIG. 4, the tapered portion 60 is formed on an end portion on the insertion-direction distal end side of the heating wire heater 2 from a position closer to the center than the inner diameter of the O-ring 50 before inserting the heating wire heater, and the rounded portion 61 is formed continuously from the tapered portion 60 in a direction toward the support position of the O-ring 50 after inserting the heating wire heater 2.

Also, the heating wire 52 within the heating wire heater 2 is installed only within a range apart, to the axially inner side, from positions where the two O-rings 50 are in contact when the heating wire heater 2 is inserted into the case 3.

Figure 5:
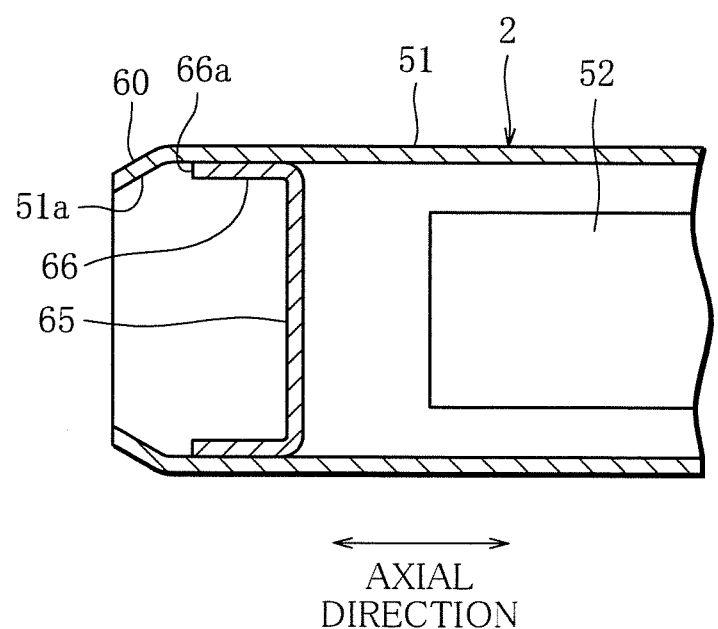
FIG. 5 is an enlarged sectional view illustrating the internal structure of an end portion of the heating wire heater in FIG. 1.

FIG. 5 is an enlarged sectional view illustrating the internal structure of an end portion of the heating wire heater 2. The drawing shows the structure of an end portion opposite to the side where the terminals 54 project out of the both end portions of the heating wire heater 2.

As shown in FIG. 5, in the end portion opposite to the side where the terminals 54 of the heating wire heater 2 project, a bottom plate 65 is welded to the cylindrical metal pipe 51 so as to seal the end portion.

The bottom plate 65 is formed in a disk shape, and a flange portion 66 is formed by perpendicularly bending an outer peripheral portion by, for example, about several cm over the entire periphery.

The bottom plate 65 is installed on the axially inner side (closer to the heating wire 52) with respect to the tapered portion 60 on the end portion of the heating wire heater 2. The flange portion 66 is arranged on the outer side, and a distal end portion 66a of the flange portion 66 and an inner wall 51a of the metal pipe 51 are welded together along the entire periphery.

Because of the above configuration, in the heating apparatus 1 of the present embodiment, when cooling water is caused to flow into the inlet portion 32, the cooling water flows downward through the lateral sides of the heating wire heaters 2, moves in the right and left direction from the inlet portion 32 side to the outlet portion 33 side in a lower portion within the case 3, and further moves upward while passing though the lateral sides of the heating wire heaters 2 to be discharged from the outlet portion 33 as indicated by an alternate long and two short dashes arrow in FIG. 1.

When the cooling water is introduced into the heating apparatus 1 and passes through the lateral side of the heating wire heater 2 as described above, the cooling water passes through the gap 45 facing the outer peripheral wall of the heating wire heater 2. Thus, the cooling water can be heated by the heat generated from the heating wire 52 by supplying electricity to the heating wire 52 of the heating wire heater 2 from the power unit 56.

Since the present embodiment employs a structure in which the cooling water directly contacts the outer peripheral wall of the heating wire heater 2, heat exchange efficiency is high. Also, the size and weight of the heating apparatus 1 can be suppressed, and the heating apparatus 1 suitably mounted on the vehicle can be obtained.

Also, since the O-rings 50 are used in the insertion portion of the heating wire heater 2 in the present embodiment, leakage of the cooling water from the inside of the case 3 can be prevented by the simple and compact structure.

Moreover, the heating apparatus 1 can be assembled by fitting the O-rings 50 to the grooves 47 of the case 3, and inserting the heating wire heaters 2, so that good assembling properties can be obtained for the heating apparatus 1.

For example, as compared with a structure in which a flange is provided on the heating wire heater 2 and the flange and the case 3 are fixed with a bolt or the like, the assembling properties can be improved, and the entire heating apparatus 1 can be made compact and reduced in weight in the present embodiment.

In the present embodiment, the tapered portion 60 and the rounded portion 61 are formed on the end portion on the insertion-direction distal end side of the heating wire heater 2. Thus, when the heating wire heater 2 is inserted into the case 3, the distal end portion of the heating wire heater 2 can be smoothly inserted without being caught by the O-rings 50, thereby preventing damage of the O-rings 50. As described above, in the heating apparatus 1 of the present invention, the assembling properties can be further improved by making it difficult to cause component damage during assembly.

Also, the heating wire 52 within the heating wire heater 2 is arranged only up to a position inwardly apart from the portions where the O-rings 50 are in contact, so that a distance between the heating wire 52 and the O-ring 50 after assembly can be ensured. Accordingly, deterioration of the O-rings 50 due to the heat from the heating wire 52 can be suppressed.

Accordingly, in the present embodiment, the damage or deterioration of the O-rings 50 can be prevented by the simple configuration, and leakage of the cooling water from the inside of the case 3 to the outside can be prevented for a long period.

Also, since the bottom plate 65 sealing the end portion of the metal pipe 51 of the heating wire heater 2 is arranged on the axially inner side with respect to the tapered portion 60, additional processing of cutting the end portion of the metal pipe 51 can be performed after welding the bottom plate 65. Therefore, the tapered portion 60 can be formed by cutting the end portion of the metal pipe 51 after welding the bottom plate 65, and the entire length of the metal pipe 51 can be adjusted, so that the shape of the tapered portion 60 of the metal pipe 51 and the entire length can be accurately set. Also, in the present embodiment, the end portion of the metal pipe 51 can be formed flat without cutting the welded portion of the bottom plate 65, so that the end portion of the heating wire heater 2 can be additionally processed into a given smooth shape while maintaining airtightness within the heating wire heater 2.

Furthermore, since the bottom plate 65 is arranged on the axially inner side with respect to the tapered portion 60, the end portion of the heating wire heater 2 has a hollow structure, so that a temperature rise in the end portion is suppressed during operation of the heating wire heater 2. Accordingly, the heat resistance of the boss portion 42 of the case 3 serving as a portion supporting the end portion of the heating wire heater 2 can be reduced, and the degree of design freedom of a material or the like can be improved.

Also, since the bottom plate 65 is welded to the inner wall 51a of the metal pipe 51, weld scale on the outer side of the metal pipe 51 can be reduced, and a connection position on the outer side of the metal pipe 51 can be eliminated. Airtightness at the boss portion 42 when the heating wire heater 2 is inserted into the case 3 can be improved.

Note that the present invention is not limited to the above embodiment. For example, at least one of the configuration in which the tapered portion 60 is provided on the end portion on the insertion-direction distal end side of the heating wire heater 2, and the configuration in which the heating wire 52 within the heating wire heater 2 is arranged at the position inwardly apart from the portions where the O-rings 50 are in contact when the heating wire heater 2 is inserted into the case 3 may be employed.

Also, in the above embodiment, the both end portions of the heating wire heater 2 are respectively supported by the O-rings 50. However, when the case 3 is configured such that the holes 30 on the insertion-direction distal end side of the heating wire heater 2 are closed, the O-ring 50 on the insertion-direction distal end side out of the two O-rings 50 becomes unnecessary. Even in this case, by forming the tapered portion 60 and the rounded portion 61 on the end portion on the insertion-direction distal end side of the heating wire heater 2 as in the above embodiment, damage of the remaining O-ring 50 can be prevented during assembly.

Also, in the above embodiment, the heating wire heater 2 is inserted into the case 3 from the side where the terminals 54 project. However, when the heating wire heater 2 is inserted into the case 3 from a side opposite to the side where the terminals 54 project, i.e., a side sealed by the bottom plate 65, the bottom plate 65 is arranged on the axially inner side with respect to the tapered portion 60 as described above, and the end portion of the metal pipe 51 is additionally processed so as to form the end portion of the heating wire heater 2 into a smooth shape. Accordingly, it is possible to make it more difficult to cause damage of the O-ring 50 when the heating wire heater 2 is inserted into the case 3.

Note that a heating element other than the heating wire 52 can be applied to the heating apparatus of the present invention. Also, a fluid other than water may be employed as the heating medium. However, by using the inexpensive and versatile heating wire heater 2, the manufacturing cost of the heating apparatus 1 can be reduced. Also, since the versatile heating wire heater 2 is generally widespread and has high reliability, the reliability of the heating apparatus 1 can be advantageously improved.

Furthermore, by incorporating the heating apparatus 1 of the present invention in the vehicle air-conditioning system of the hybrid automobile or the electric automobile, the assembling properties of the cooling water circuit, the refrigerating circuit, and the air-conditioning system where the circuits are provided, and resultantly, the above vehicle where the air-conditioning system is mounted can be advantageously improved, and the manufacturing cost can be also advantageously reduced. Of course, the heating apparatus 1 can be not only incorporated in the above vehicle air-conditioning system, but also used as a heat source for another use.

EXPLANATION OF REFERENCE SIGNS

1 Heating Apparatus
2 Heating Wire Heater (Heating Element)
3 Case
42, 43 Boss portion
45 Gap (Heating Medium Passage)
50 O-ring 51 Metal Pipe (Tube Portion)
52 Heating Wire
60 Tapered Portion
61 Rounded portion
65 Bottom Plate

The invention claimed is:

1. A heating apparatus which is assembled by inserting a columnar heating element into a hole provided in a case, and heats a heating medium introduced into the case by the heating element,
   wherein the heating element includes a cylindrical tube portion where a tapered portion is formed at least on one end portion, a heating wire provided inside the tube portion, and a bottom plate that seals an end portion on the tapered portion side of the tube portion, the end portion is inserted into a boss portion provided in the case, and is supported by an O-ring disposed between an inner peripheral wall of the boss portion and an outer peripheral wall of the heating element,
   a heating medium passage for passing the heating medium is formed along an outer peripheral surface of the heating element on an inner side of the O-ring within the case, and
   the bottom plate is arranged on an axially inner side of the tube portion with respect to the tapered portion.

2. The heating apparatus according to claim 1, wherein the bottom plate is welded to an inner wall of the tube portion to seal the end portion of the tube portion.

3. The heating apparatus according to claim 1,
   wherein the heating apparatus is mounted on a vehicle, and
   the heating medium is cooling water used for an air-conditioning system of the vehicle.

4. The heating apparatus according to claim 2,
   wherein the heating apparatus is mounted on a vehicle, and
   the heating medium is cooling water used for an air-conditioning system of the vehicle.

* * * * *